US012092872B2

(12) United States Patent
Hung et al.

(10) Patent No.: US 12,092,872 B2
(45) Date of Patent: Sep. 17, 2024

(54) WAVELENGTH DIVISION MULTIPLEXER AND DEMULTIPLEXER

(71) Applicant: NATIONAL SUN YAT-SEN UNIVERSITY, Kaohsiung (TW)

(72) Inventors: Yung-Jr Hung, Kaohsiung (TW); Tzu-Hsiang Yen, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 57 days.

(21) Appl. No.: 17/933,487

(22) Filed: Sep. 20, 2022

(65) Prior Publication Data

US 2023/0228944 A1 Jul. 20, 2023

(30) Foreign Application Priority Data

Jan. 14, 2022 (TW) .................................. 111101582

(51) Int. Cl.
*G02B 6/293* (2006.01)
(52) U.S. Cl.
CPC ....... *G02B 6/29355* (2013.01); *G02B 6/2938* (2013.01)
(58) Field of Classification Search
None
See application file for complete search history.

(56) References Cited

U.S. PATENT DOCUMENTS

| | | | |
|---|---|---|---|
| 5,852,505 A * | 12/1998 | Li | G02B 6/2938 398/58 |
| 6,351,581 B1 | 2/2002 | Doerr et al. | |
| 11,048,041 B2 | 6/2021 | Ravi et al. | |
| 2013/0101249 A1* | 4/2013 | Doerr | G02B 6/12011 385/129 |
| 2017/0276878 A1 | 9/2017 | Hu et al. | |
| 2019/0245642 A1 | 8/2019 | Akiyama | |
| 2020/0379181 A1 | 12/2020 | Akiyama | |
| 2021/0041644 A1* | 2/2021 | Fincato | G02B 6/4215 |

FOREIGN PATENT DOCUMENTS

JP 2002-207135 A 7/2002
TW 201205135 A1 2/2012

* cited by examiner

*Primary Examiner* — Chad H Smith
(74) *Attorney, Agent, or Firm* — CKC & Partners Co., LLC

(57) ABSTRACT

A waveguide division multiplexer and demultiplexer includes a first-stage Mach-Zehnder interferometer (MZI) and two second-stage MZIs. The first-stage MZI includes two input ends and two output ends, in which one of the inputs is configured to receive an input optical beam with a first center wavelength and a second center wavelength, and the output ends are configured to respectively transmit first-stage output optical beams respectively with the first center wavelength and the second center wavelength. One input terminals of the second-stage MZI are configured to respectively receive the first-stage output optical beams, and one output terminals of the second-stage MZI are configured to transmit second-stage output optical beams with the first and second center wavelengths, respectively. Each second-stage MZI is configured in cross-state condition.

15 Claims, 12 Drawing Sheets

WAVELENGTH DIVISION MULTIPLEXER AND DEMULTIPLEXER

RELATED APPLICATION

This application claims priority to Taiwan Application Serial Number 111101582, filed Jan. 14, 2022, which is herein incorporated by reference in its entirety.

BACKGROUND

Field of Invention

The present disclosure relates to an optical waveguide, and more particularly to a fabrication insensitive wavelength division multiplexer and demultiplexer.

Description of Related Art

Optical wavelength division multiplexers and demultiplexers are usually needed within optical transceivers to transmit and receive optical signals on the defined wavelength grids. Common approaches to realize wavelength division (de)multiplexers include arrayed waveguide gratings, echelle gratings, micro-ring resonators, and Mach-Zehnder interferometers (MZIs). Among those options, wavelength division multiplexer and demultiplexer based on cascaded MZIs has been widely applied due to its low insertion loss, flat-top passband, and low channel crosstalk. However, the spectral response of a MZI is sensitive to the variation in component geometries, which can be induced by process variations. It often requires phase shifters to compensate the phase error in one arm of the MZIs such that the spectral response of the resultant wavelength division multiplexer and demultiplexer can be aligned to the wavelength grids defined by the International Telecommunication Union Telecommunication Standardization Sector (ITU-T) standards. Furthermore, the channel crosstalk of a wavelength division multiplexer and demultiplexer is not consistent over the wavelengths of interest due to the wavelength dependent and fabrication sensitive response of power splitting directional couplers.

SUMMARY

The object of the present disclosure is to provide a fabrication insensitive wavelength division multiplexer and demultiplexer that effectively reduces the wavelength drift and channel crosstalk upon process imperfection, so as to further improve the device production yield.

One aspect of the present disclosure is to provide a wavelength division multiplexer and demultiplexer which includes a waveguide structure with a first-stage MZI structure and two second-stage MZI structures. The first-stage MZI structure has two input terminals and two output terminals, in which one of the input terminals is configured to receive an input optical beam with a first center wavelength and a second center wavelength, and the output terminals are configured to transmit one first-stage output optical beam with the first center wavelength and another first-stage output optical beam with the second center wavelength, respectively. One input terminals of the second-stage MZI structures are configured to respectively receive the first-stage output optical beams. One output terminals of the second-stage MZI structures are configured to transmit one second-stage output optical beam with the first center wavelength and another second-stage output optical beam with the second center wavelength, respectively. Each second-stage MZI structure is configured in cross-state condition, i.e. the input optical beam and output optical beam of the second-stage MZI are not at the same optical waveguide path.

In accordance with one or more embodiments of the present disclosure, the first-stage MZI structure includes at least two optical couplers and at least one set of phase delayed waveguides that are alternately coupled, and lengths and widths of two waveguide arms in the same set of phase delayed waveguides are different to each other.

In accordance with one or more embodiments of the present disclosure, each second-stage MZI structure comprises at least two optical couplers and at least one set of phase delayed waveguides that are alternately coupled, and lengths and widths of two waveguide arms in the same set of phase delayed waveguides are different to each other.

In accordance with one or more embodiments of the present disclosure, the phase delayed waveguides of the second-stage MZI structures respectively have relative optical path phase shifts of 0 and $\pi$, i.e. the phase delayed waveguides respectively have relative waveguide length differences of 0 and $\lambda/2n$, where $\lambda$ is the optical wavelength, and n is the effective refractive index of the waveguide, such that the output spectra are respectively aligned with the first and second center wavelengths.

In accordance with one or more embodiments of the present disclosure, the waveguide structure further includes two third-stage MZI structures. One input terminals of the third-stage MZI structures are configured to respectively receive the second-stage output optical beams of the second-stage MZI structures, one output terminals of the third-stage MZI structures are configured to transmit one third-stage output optical beam with the first center wavelength and another third-stage output optical beam with the second center wavelength, respectively, and each third-stage MZI structure is configured in cross-state condition, i.e. the input optical beam and output optical beam of the third-stage MZI are not at the same optical waveguide path.

In accordance with one or more embodiments of the present disclosure, each third-stage MZI structure comprises at least two optical couplers and at least one set of phase delayed waveguides that are alternately coupled, and lengths and widths of two waveguide arms in the same set of phase delayed waveguides are different to each other.

Another aspect of the present disclosure is to provide a wavelength division multiplexer and demultiplexer which includes a first waveguide structure and two second waveguide structures. The first waveguide structure includes a first-stage MZI structure and two second-stage MZI structures. In the first waveguide structure, the first-stage MZI structure having two input terminals and two output terminals, in which one of the input terminals is configured to receive an input optical beam with a first center wavelength, a second center wavelength, a third center wavelength and a fourth center wavelength, and the output terminals are configured to transmit one first-stage output optical beam with the first and second center wavelengths and another first-stage output optical beam with the third and fourth center wavelengths, respectively; one input terminals of the second-stage MZI structures are configured to respectively receive the first-stage output optical beams, one output terminals of the second-stage MZI structures are configured to transmit one second-stage output optical beam with the first center wavelength and the second center wavelength and another second-stage output optical beam with the third center wavelength and the fourth center wavelength, respectively, and each second-stage MZI structure is configured in cross-state condition, i.e. the input optical beam and output optical beam of the second-stage MZI are not at the same optical waveguide path. In one of the second waveguide structures, the first-stage MZI structure having two input terminals and two output terminals, in which one of the input terminals is configured to receive the second-stage output optical beam with the first and second center wavelengths outputted by the first waveguide structure, and the output terminals are configured to transmit one first-stage output optical beam with the first center wavelength and another first-stage output optical beam with the second center wavelength, respectively; the second-stage MZI structures are all configured in cross-state condition and each has two input terminals and two output terminals, in which one input terminals are configured to respectively receive the first-stage output optical beam with the first center wavelength and the first-stage output optical beam with the second center wavelength, and one output terminals of the second-stage MZI structures are configured to transmit one second-stage output optical beam with the first center wavelength and another second-stage output optical beam with the second center wavelength, respectively. In the other of the second waveguide structures, the first-stage MZI structure has two input terminals and two output terminals, in which one of the input terminals is configured to receive the second-stage output optical beam with the third and fourth center wavelengths outputted by the first waveguide structure, and the output terminals are configured to transmit one first-stage output optical beam with the third center wavelength and another first-stage output optical beam with the fourth center wavelength, respectively; the second-stage MZI structures are all configured in cross-state condition and each has two input terminals and two output terminals, in which the input terminals are configured to respectively receive the first-stage output optical beam with the third center wavelength and the first-stage output optical beam with the fourth center wavelength, and the output terminals of the second-stage MZI structures are configured to transmit one second-stage output optical beam with the third center wavelength and another second-stage output optical beam with the fourth center wavelength, respectively.

In accordance with one or more embodiments of the present disclosure, phase delayed waveguides of the second-stage MZI structures of the first waveguide structure respectively have relative optical path phase shifts of 0 and $\pi$, i.e. the phase delayed waveguides respectively have relative waveguide length differences of 0 and $\lambda/2n$, where $\lambda$ is the optical wavelength, and n is the effective refractive index of the waveguide, such that the output spectra are respectively aligned with a set of the first and second center wavelengths and a set of the third and fourth center wavelengths. Phase delayed waveguides of the first-stage MZI structures of the second waveguide structures respectively have relative optical path phase shifts of 0 and $\pi/2$, i.e. the phase delayed waveguides respectively have relative waveguide length differences of 0 and $\lambda/4n$, such that the output spectra are respectively aligned with a set of the first and second center wavelengths and a set of the third and fourth center wavelengths. Phase delayed waveguides of the second-stage MZI structures of the second waveguide structures respectively have relative optical path phase shifts of 0, $\pi$, $3\pi/2$ and $\pi/2$, i.e. the phase delayed waveguides respectively have relative waveguide length differences of 0, $\lambda/2n$, $3\lambda/4n$ and $\lambda/4n$, such that the output spectra are respectively aligned with the first to fourth center wavelengths.

In accordance with one or more embodiments of the present disclosure, each of the first-stage MZI structure and the second-stage MZI structures of the first waveguide structure comprises four optical couplers and three phase delayed waveguides that are alternately coupled, and lengths and widths of two waveguide arms in the same phase delayed waveguide are different to each other.

In accordance with one or more embodiments of the present disclosure, cross-coupling coefficients of the four optical couplers in each of the first-stage MZI structure and the second-stage MZI structures of the first waveguide structure are 0.5, 0.17, 0.23 and 0.05, respectively.

In accordance with one or more embodiments of the present disclosure, each of the first-stage MZI structure and the second-stage MZI structures of each of the second waveguide structures comprises three optical couplers and two sets of phase delayed waveguides that are alternately coupled, and lengths and widths of two waveguide arms in the same phase delayed waveguide are different to each other.

In accordance with one or more embodiments of the present disclosure, cross-coupling coefficients of the three optical couplers in each the first-stage MZI structure and the second-stage MZI structures of each of the second waveguide structures are 0.5, 0.3 and 0.05, respectively.

In accordance with one or more embodiments of the present disclosure, one of the second waveguide structures further includes third-stage MZI structures, in which one input terminals of the third-stage MZI structures are configured to respectively receive the second-stage output optical beams respectively with the first and second center wavelengths from the second-stage MZI structures, one output terminals of the third-stage MZI structures are configured to transmit one third-stage output optical beam with the first center wavelength and another third-stage output optical beam with the second center wavelength, respectively, and each third-stage MZI structure is configured in cross-state condition, i.e. the input optical beam and output optical beam of the third-stage MZI are not at the same optical waveguide path. The other of the second waveguide structures further includes two third-stage MZI structures, in which one input terminals of the third-stage MZI structures are configured to respectively receive the second-stage output optical beams respectively with the third and fourth center wavelengths from the second-stage MZI structures, one output terminals of the third-stage MZI structures are configured to transmit one third-stage output optical beam with the third center wavelength and another third-stage output optical beam with the fourth center wavelength, respectively, and each third-stage MZI structure is configured in cross-state condition.

In accordance with one or more embodiments of the present disclosure, each third-stage MZI structure comprises at least three optical couplers and at least two sets of phase delayed waveguides that are alternately coupled, and lengths and widths of two waveguide arms in the same phase delayed waveguide are all different to each other.

In accordance with one or more embodiments of the present disclosure, cross-coupling coefficients of the three optical couplers in each third-stage MZI structure are 0.5, 0.3 and 0.05, respectively.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
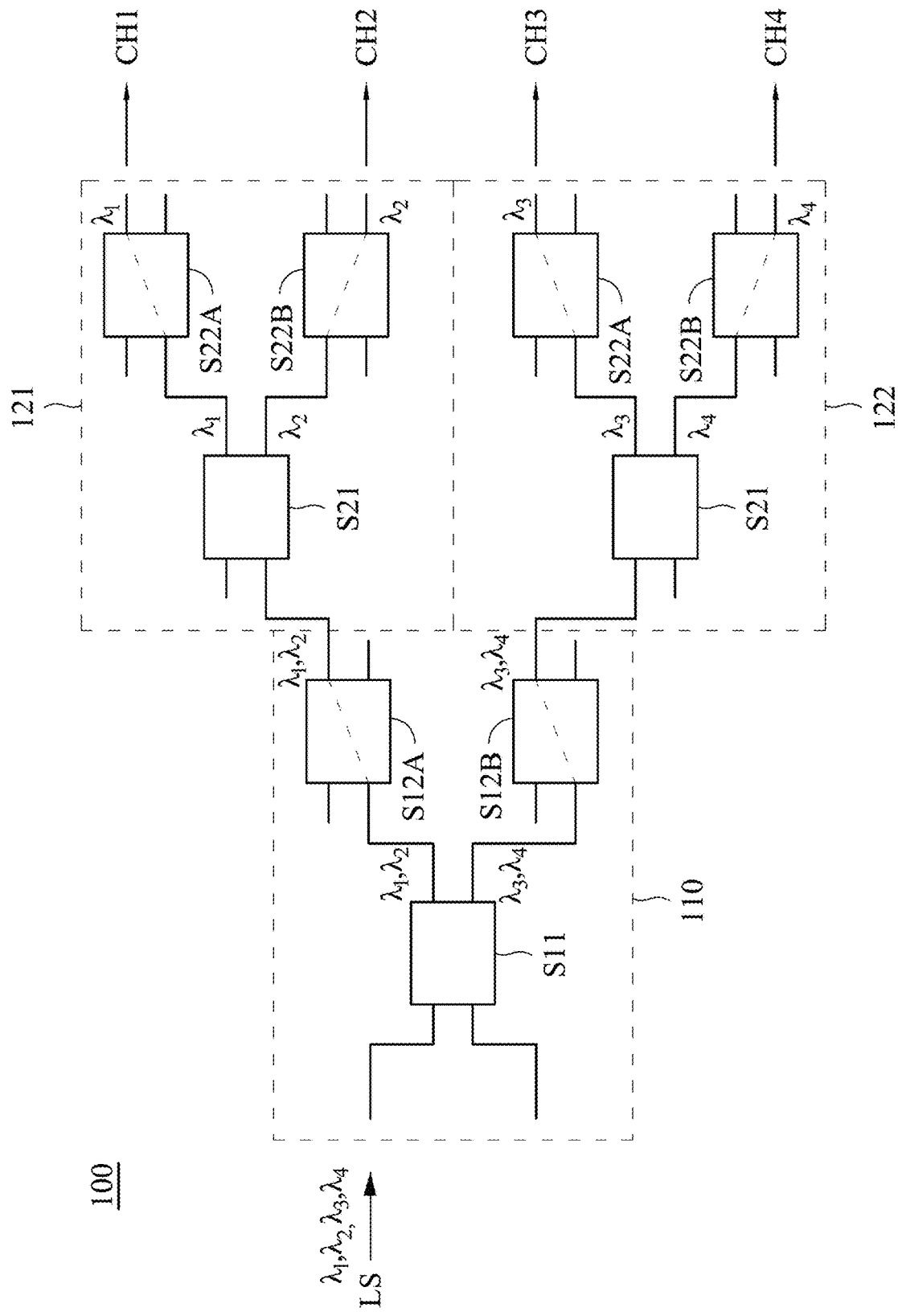
FIG. 1 is a schematic component arrangement diagram of a wavelength division multiplexer and demultiplexer in accordance with one or more embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Terms used herein are used only to describe the specific embodiments, which are not used to limit the claims appended herewith. Unless limited otherwise, the term "a," "an," "one" or "the" of the single form may also represent the plural form.

It will be understood that, although the terms "first," "second," "third" . . . etc., may be used herein to describe various elements and/or components, these elements and/or components, should not be limited by these terms. These terms are only used to distinguish elements and/or components.

The document may repeat reference numerals and/or letters in the various examples. This repetition is for the purpose of simplicity and clarity and does not in itself dictate a relationship between the various embodiments and/or configurations discussed.

FIG. 1 is a schematic component arrangement diagram of a wavelength division multiplexer and demultiplexer 100 in accordance with one or more embodiments of the present disclosure. The wavelength division multiplexer and demultiplexer 100 include one first waveguide structure 110 and two second waveguide structures 121, 122. The first waveguide structure 110 and the second waveguide structures 121, 122 may be waveguide structures formed of silicon, silicon nitride or another material, and may be formed on the same substrate, e.g. a silicon-on-insulator (SOI) substrate or another suitable semiconductor substrate. The wavelength division multiplexer and demultiplexer 100 may be fabricated by a semiconductor process, e.g. a CMOS foundry process or another suitable semiconductor process. In the wavelength division multiplexer and demultiplexer 100, each of the first waveguide structure 110 and the second waveguide structures 121, 122 may be formed of one first-stage MZI structure and two second-stage MZI structures. As shown in FIG. 1, in the first waveguide structure 110, two outputs of the first-stage MZI structure S11 are respectively coupled to one input terminal of the second-stage MZI structure S12A and one input terminal of the second-stage MZI structure S12B, and in each of the second waveguide structures 121, 122, two outputs of the first-stage MZI structure S21 are respectively coupled to one input terminal of the second-stage MZI structure S22A and one input terminal of the second-stage MZI structure S22B.

Specifically, in the first waveguide structure 110, the first-stage MZI structure S11 has two input terminals and two output terminals; one of the input terminals may be configured to receive an input optical beam LS with a first center wavelength, a second center wavelength, a third center wavelength and a fourth center wavelength, and the output terminals may be configured to respectively transmit a first-stage output optical beam with the first center wavelength and the second center wavelength and another first-stage output optical beam with the third center wavelength and the fourth center wavelength. One input terminal of the second-stage MZI structure S12A and one input terminal of the second-stage MZI structure S12B may be configured to respectively receive the first-stage output optical beams from the first-stage MZI structure S11, and one output terminal of the second-stage MZI structure S12A and one output terminal of the second-stage MZI structure S12B may be configured to respectively transmit a second-stage output optical beam with the first center wavelength and the second center wavelength and another second-stage output optical beam with the third center wavelength and the fourth center wavelength. The second-stage MZI structures S12A, S12B are all configured in cross-state condition, i.e. the optical input and the optical output for each of the second-stage MZI structures S12A, S12B are not in the same optical waveguide path.

Similarly, in the second waveguide structure 121, the first-stage MZI structure S21 has two input terminals and two output terminals; one of the input terminals may be configured to receive an input optical beam with the first center wavelength and the second center wavelength, and the output terminals may be configured to respectively transmit a first-stage output optical beam with the first center wavelength and another first-stage output optical beam with the second center wavelength. One input terminal of the second-stage MZI structure S22A and one input terminal of the second-stage MZI structure S22B may be configured to respectively receive the first-stage output optical beams from the first-stage MZI structure S21, and one output terminal of the second-stage MZI structure S22A and one output terminal of the second-stage MZI structure S22B may be configured to respectively transmit a second-stage output optical beam with the first center wavelength and another second-stage output optical beam with the second center wavelength. In the second waveguide structure 122, the first-stage MZI structure S21 has two input terminals and two output terminals; one of the input terminals may be configured to receive an input optical beam with the third center wavelength and the fourth center wavelength, and the output terminals may be configured to respectively transmit a first-stage output optical beam with the third center wavelength and another first-stage output optical beam with the fourth center wavelength. One input terminal of the second-stage MZI structure S22A and one input terminal of the second-stage MZI structure S22B may be configured to respectively receive the first-stage output optical beams from the first-stage MZI structure S21, and one output terminal of the second-stage MZI structure S22A and one output terminal of the second-stage MZI structure S22B may be configured to respectively transmit a second-stage output optical beam with the third center wavelength and another second-stage output optical beam with the fourth center wavelength. The second-stage MZI structures S22A, S22B of the second waveguide structures 121, 122 are also all configured in cross-state condition.

Therefore, for the overall configuration of the wavelength division multiplexer and demultiplexer 100, if the wavelength band of the input optical beam LS covers four different center wavelengths $\lambda_1$, $\lambda_2$, $\lambda_3$ and $\lambda_4$ (i.e. the first center wavelength, the second center wavelength, the third center wavelength and the fourth center wavelength described above), then the center wavelengths of the output optical beams in the four channels CH1-CH4 after passing the wavelength division multiplexer and demultiplexer 100 may be $\lambda_1$, $\lambda_2$, $\lambda_3$ and $\lambda_4$, respectively. In order to ensure that the wavelength division multiplexer and demultiplexer 100 achieve the goal, the phase delayed waveguides of the second-stage MZI structures S12A and S12B in the first waveguide structure 110 respectively have relative optical path phase shifts of 0 and $\pi$, i.e. the phase delayed waveguides respectively have relative waveguide length differences of 0 and $\lambda/2n$, where $\lambda$ is the optical wavelength, and n is the effective refractive index of the waveguide; the phase delayed waveguides of the two first-stage MZI structures S21 in the second waveguide structures 121 and 122 respectively have relative waveguide length differences of 0 and $\pi/2$, i.e. the phase delayed waveguides respectively have relative waveguide length differences of 0 and $\lambda/4n$, and the phase delayed waveguides of the second-stage MZI structures S22A and S22B in the second waveguide structure 121 and the second-stage MZI structures S22A and S22B in the second waveguide structure 122 respectively have relative optical phase shifts of 0, $\pi$, $3\pi/2$ and $\pi/2$, i.e. the phase delayed waveguides respectively have relative waveguide length differences of 0, $\lambda/2n$, $3\lambda/4n$ and $\lambda/4n$, such that the output spectra are respectively aligned with the center wavelengths $\lambda_1$, $\lambda_2$, $\lambda_3$ and $\lambda_4$.

Figure 2A:
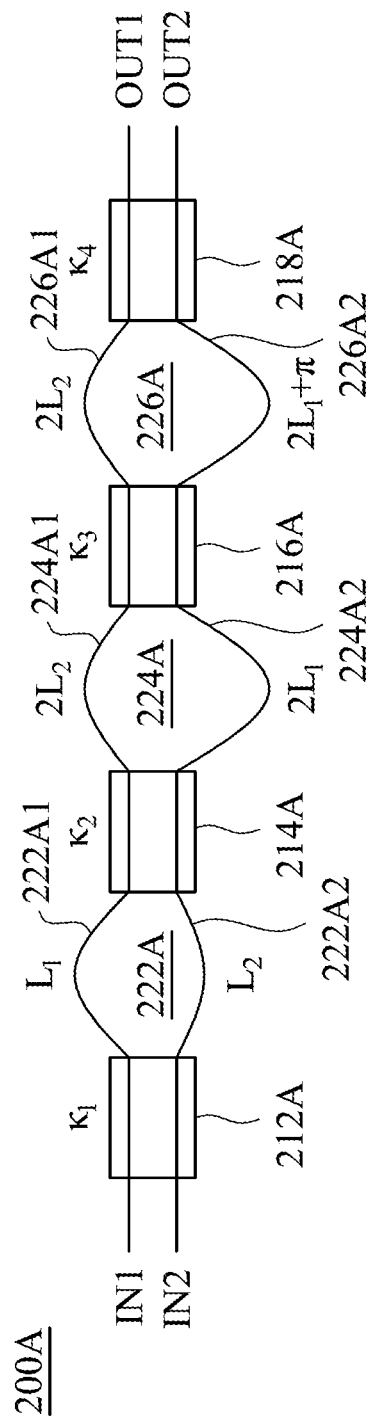
FIG. 2A is a schematic diagram of a three-stage cascaded MZI structure in accordance with one or more embodiments of the present disclosure.

FIG. 2A is a schematic diagram of a three-stage cascaded MZI structure 200A in accordance with one or more embodiments of the present disclosure. The MZI structure 200A includes four optical couplers 212A, 214A, 216A, 218A and three phase delayed waveguides 222A, 224A, 226A, in which the phase delayed waveguide 222A includes waveguide arms 222A1, 222A2, the phase delayed waveguide 224A includes waveguide arms 224A1, 224A2, and the phase delayed waveguide 226A includes waveguide arms 226A1, 226A2.

The optical couplers 212A, 214A, 216A, 218A and the phase delayed waveguides 222A, 224A, 226A are alternately connected in series, i.e. two input terminals of the phase delayed waveguide 222A are respectively coupled to two output terminals of the optical coupler 212A, two input terminals of the optical coupler 214A are respectively coupled to two output terminals of the phase delayed waveguide 222A, two input terminals of the phase delayed waveguide 224A are respectively coupled to two output terminals of the optical coupler 214A, and the like. The cross-coupling coefficients of the optical couplers 212A, 214A, 216A, 218A are κ1, κ2, κ3 and κ4, respectively. Two input terminals of the optical coupler 212A are configured as input terminals IN1, IN2 of the MZI structure 200A, respectively, and two output terminals of the optical coupler 218A are configured as output terminals OUT1, OUT2 of the MZI structure 200A, respectively. The output terminals OUT1, OUT2 are configured as a bar output terminal and a cross output terminal corresponding to the input terminal IN1, respectively, and/or are configured as a cross output terminal and a bar output terminal corresponding to the input terminal IN2, respectively.

Figure 2B:
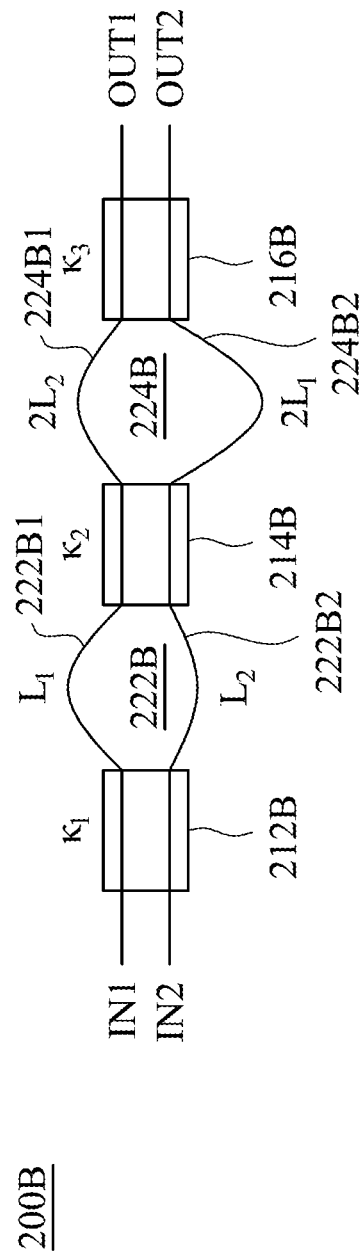
FIG. 2B is a schematic diagram of a two-stage cascaded MZI structure in accordance with one or more embodiments of the present disclosure.

FIG. 2B is a schematic diagram of a two-stage cascaded MZI structure 200B in accordance with one or more embodiments of the present disclosure. The MZI structure 200B includes three optical couplers 212B, 214B, 216B and two phase delayed waveguides 222B, 224B, in which the phase delayed waveguide 222B includes waveguide arms 222B1, 222B2, and the phase delayed waveguide 224B includes waveguide arms 224B1, 224B2. The optical couplers 212B, 214B, 216B and the phase delayed waveguides 222B, 224B may be respectively similar to the optical couplers 212A, 214A, 216A and the phase delayed waveguides 222A, 224A of the MZI structure 200A. Two input terminals of the optical coupler 212B are configured as input terminals IN1, IN2 of the MZI structure 200B, respectively, and two output terminals of the optical coupler 216B are configured as output terminals OUT1, OUT2 of the MZI structure 200B, respectively.

Figure 3:
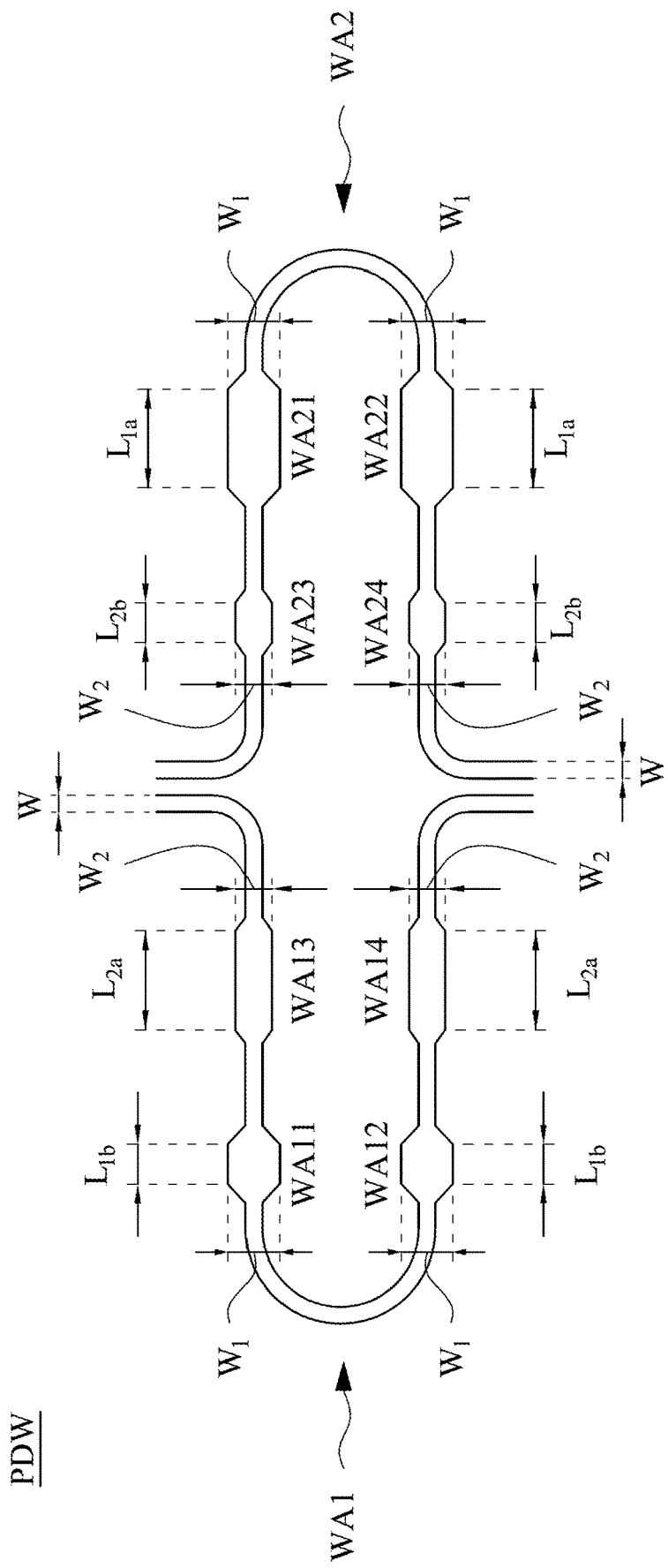
FIG. 3 exemplarily illustrates a phase difference waveguide structure with several protruding portions in each arm.

FIG. 3 exemplarily illustrates a phase delayed waveguide PDW which includes a left waveguide arm WA1 with protruding portions WA11-WA14 and a right waveguide arm WA2 with protruding portions WA21-WA24. The left waveguide arm WA1 has reflection symmetry, in which the protruding portions WA11 and WA13 are respectively the same as the protruding portions WA12 and WA14. Similarly, the right waveguide arm WA2 has reflection symmetry, in which the protruding portions WA21 and WA23 are respectively the same as the protruding portions WA22 and WA24. Each of the protruding portions WA11 and WA12 has a length $L_{1b}$ and a width $W_1$, each of the protruding portions WA13 and WA14 has a length $L_{2a}$ and a width $W_2$, each of the protruding portions WA21 and WA22 has a length $L_{1a}$ and the width $W_1$, each of the protruding portions WA23 and WA24 has a length $L_{2b}$ and the width $W_2$, and the other non-protruded portions of the left waveguide arm WA1 and the right waveguide arm WA2 has a width W, where $W_1 \geq W$, $W_2 \geq W$, $L_{1a} > L_{1b}$ and $L_{2a} > L_{2b}$. In some alternative embodiments, the parameter $W_1$ and/or $W_2$ is less than the parameter W for some designs. In addition, each of the protruding portions WA11-WA14 and WA21-WA24 has tapered waveguide sections at the opposite ends thereof.

Figure 4A:
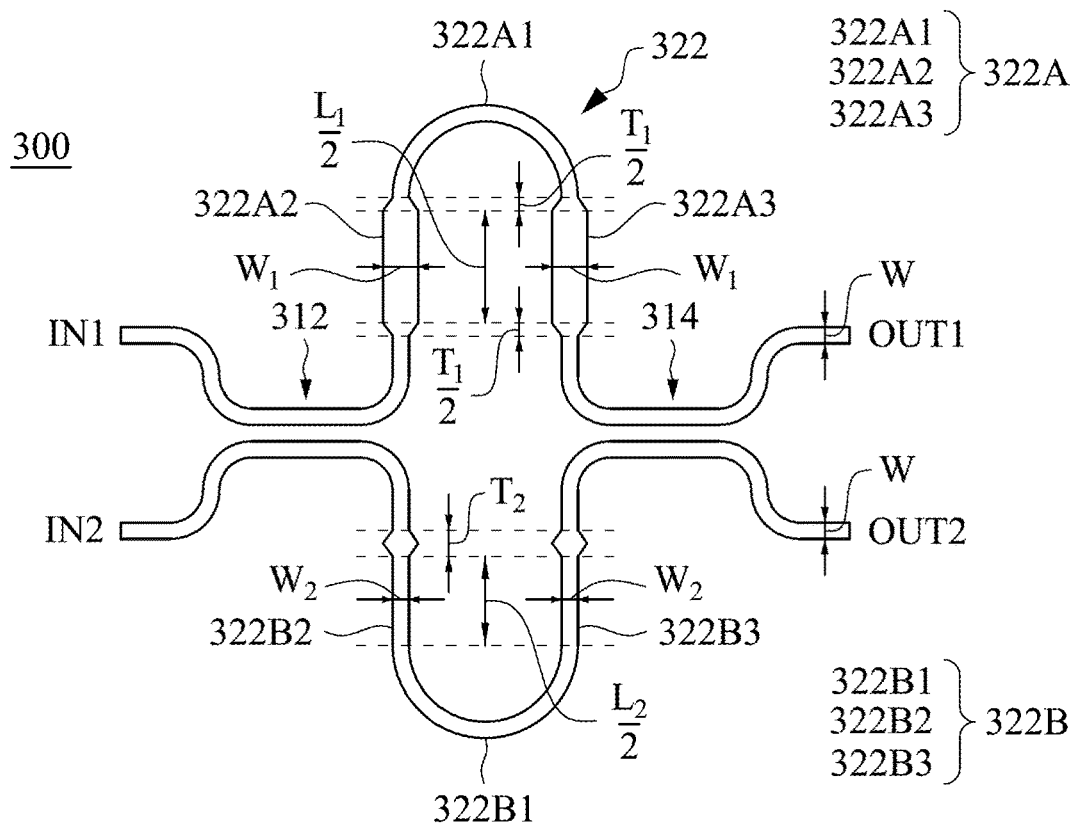
FIG. 4A is a planar structural view of a MZI structure in accordance with one or more embodiments of the present disclosure.
Figure 4B:
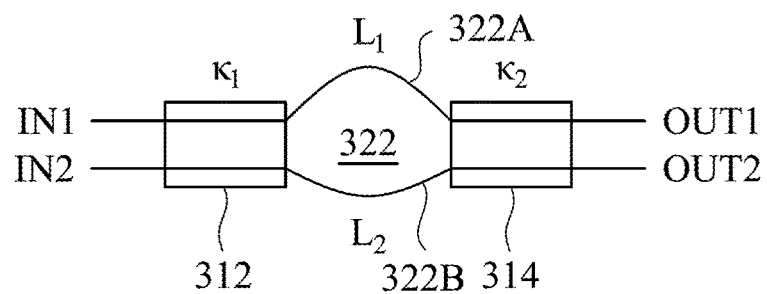
FIG. 4B is a schematic component connection diagram of the MZI structure in FIG. 4A.

FIG. 4A is a planar structural view of an MZI structure 300 in accordance with one or more embodiments of the present disclosure, and FIG. 4B is a schematic component connection diagram of the MZI structure 300. As shown in FIGS. 4A and 4B, the MZI structure 300 is formed of an upper waveguide and a lower waveguide; the two terminals of the upper waveguide are configured respectively as an input terminal IN1 and an output terminal OUT1 of the MZI structure 300, while the two terminals of the lower waveguide are configured respectively as an input terminal IN2 and an output terminal OUT2 of the MZI structure 300. The MZI structure 300 includes optical couplers 312, 314 and a phase delayed waveguide 322. Waveguide arms 322A, 322B of the phase delayed waveguide 322 are respective portions of the upper and lower waveguides of the MZI structure 300. The waveguide arm 322A includes a curved section 322A1 and protruding portions 322A2 and 322A3 respectively coupled to two opposite ends of the curved section 322A1, and the waveguide arm 322B includes a curved section 322B1 and protruding portions 322B2 and 322B3 respectively coupled to two opposite ends of the curved section 322B1. Each of the protruding portions 322A2 and 322A3 has a length $L_1/2$ and a width $W_1$, each of the protruding portions 322B2 and 322B3 has a length $L_2/2$ and a width $W_2$, and each of the curved sections 322A1 and 322B1 has a width W. The curved sections of the waveguide arm 322A may be the same as those of the waveguide arm 322B. In the case that the curved section 322A1 of the waveguide arm 322A have a width different from $W_1$, a pair of tapered waveguide sections each with a length $T_1/2$ is needed to connect each curved and straight section of the waveguide arm 322A. Tapered waveguide sections similar to those in the waveguide arm 322A may be also included in the waveguide arm 322B for not introducing optical phase difference from the tapered waveguide sections. Particularly, the phase delayed waveguide 322 in FIG. 4A is a special case of the phase delayed waveguide PDW in FIG. 3, in which $W_2=W$, $L_1=2(L_{1a}-L_{1b})$ and $L_2=2(L_{2a}-L_{2b})$. Also, as shown in FIG. 4A, in the waveguide arm 322B, a rhombus-shaped waveguide section (similar to the two tapered sections in combination) with a length $T_2$ is coupled between the coupler 312 and the protruding portions 322B2, and the other rhombus-shaped waveguide section with the same length $T_2$ is coupled between the coupler 314 and the protruding portions 322B3. The parameters $T_1$ and $T_2$ may be equal for not generating undesired additional optical phase difference.

The length $L_1$ and the width $W_1$ of the waveguide arm 322A and the length $L_2$ and the width $W_2$ of the waveguide arm 322B may be decided based on the following descriptions. The phase condition of the destructive interference in the MZI structure at the wavelength $\lambda_0$ can be expressed as $m\lambda_0 = n_1 L_1 - n_2 L_2$, where m is an integer, and $n_1$, $n_2$ are the effective refractive indices respectively of the waveguide arms 322A, 322B. The spectral shift due to the waveguide linewidth error of the MZI structure at the wavelength $\lambda_0$ can be derived from the following equation:

$$\partial\lambda/\partial w = \lambda_0[(\partial n_1/\partial w_1)L_1 - (\partial n_2/\partial w_2)L_2]/(n_{g,1}L_1 - n_{g,2}L_2)$$

The MZI structure can achieve fabrication-insensitive if the spectral shift along with the change of the waveguide width thereof is 0. Hence, a fabrication-insensitive MZI structure with a target free spectral range (FSR) $\Delta\lambda$ can be designed by utilizing the following equation:

$$\partial n_1/\partial w_1)L_1 - (\partial n_2/\partial w_2)L_2 = 0 \text{ and } \Delta\lambda = (\lambda_0)^2/(n_{g,1}L_1 - n_{g,2}L_2),$$

where $n_{g,1}$, $n_{g,2}$ are the group indices respectively of the waveguide arms 322A, 322B.

Figure 5A:
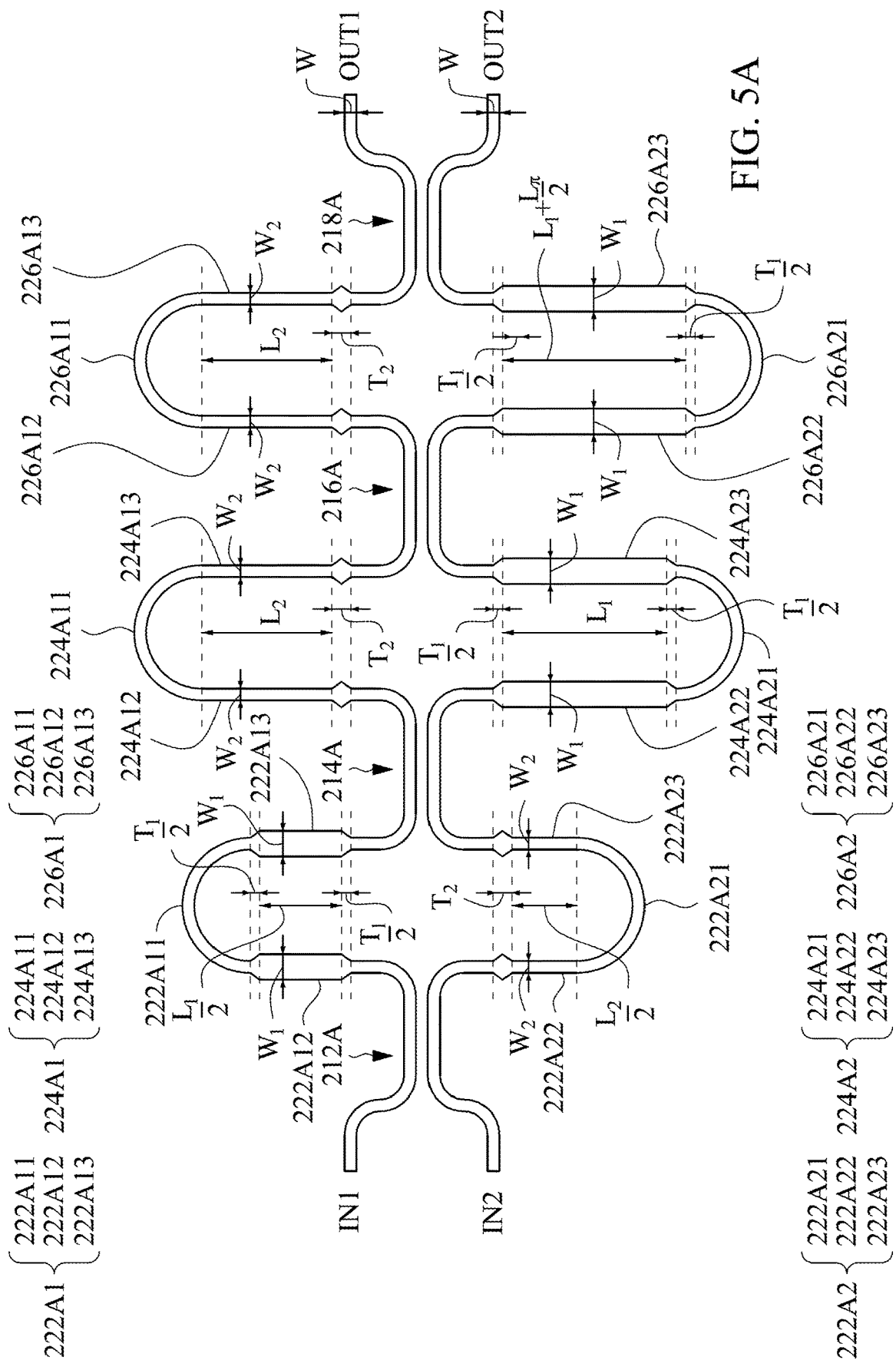
FIGS. 5A and 5B are planar structural views of the MZI structures respectively in FIGS. 2A and 2B.

The structures corresponding to the component connection diagrams of the MZI structures 200A and 200B shown in FIGS. 2A and 2B may also be implemented similar to the planar structural diagram and component connection diagram of the MZI structure 300 respectively shown in FIGS. 4A and 4B. FIG. 5A is a planar structural view of the MZI structure 200A shown in FIG. 2A. As shown in FIGS. 2A and 5A, in the phase delayed waveguide 222A, the waveguide arm 222A1 includes a curved section 222A11 and protruding portions 222A12 and 222A13 respectively coupled to two opposite ends of the curved section 222A11, and the waveguide arm 222A2 includes a curved section 222A21 and protruding portions 222A22 and 222A23 respectively coupled to two opposite ends of the curved section 222A21; in the phase delayed waveguide 224A, the waveguide arm 224A1 includes a curved section 224A11 and protruding portions 224A12 and 224A13 respectively coupled to two opposite ends of the curved section 224A11, and the waveguide arm 224A2 includes a curved section 224A21 and protruding portions 224A22 and 224A23 respectively coupled to two opposite ends of the curved section 224A21; in the phase delayed waveguide 226A, the waveguide arm 226A1 includes a curved section 226A11 and protruding portions 226A12 and 226A13 respectively coupled to two opposite ends of the curved section 226A11, and the waveguide arm 226A2 includes a curved section 226A21 and protruding portions 226A22 and 226A23 respectively coupled to two opposite ends of the curved section 226A21. The structural characteristics of the phase delayed waveguide 222A are identical to those of the phase delayed waveguide 322 shown in FIG. 4A, and thus the detailed description thereof is not repeated herein. The waveguide arms 224A2 and 226A2 are similar to the waveguide arm 222A1, except that the length of each of the protruding portions 224A22 and 224A23 is $L_1$ and the length of each of the protruding portions 226A22 and 226A23 is $L_1 + F(L_\pi/2)$, where $L_\pi = \lambda_0/2n_1$ and $n_1$ is effective index of the waveguide having a width of $W_1$. The waveguide arms 224A1 and 226A1 are similar to the waveguide arm 222A2, except that the length of each of the protruding portions 224A12, 224A13, 226A12 and 226A13 is $L_2$.

Figure 5B:
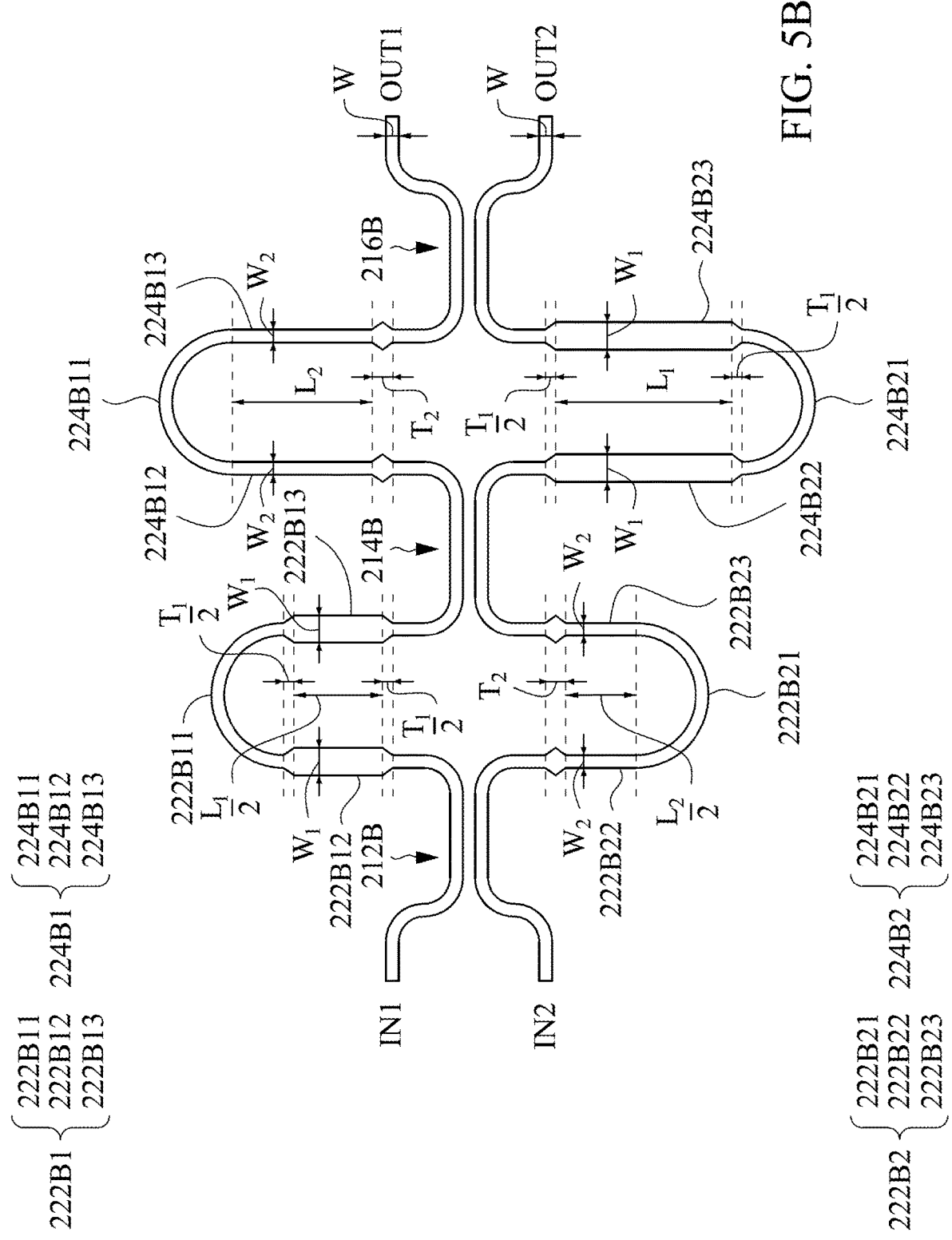

In addition, FIG. 5B is a planar structural view of the MZI structure 200B shown in FIG. 2B. As shown in FIGS. 2B and 5B, in the phase delayed waveguide 222B, the waveguide arm 222B1 includes a curved section 222B11 and protruding portions 222B12 and 222B13 respectively coupled to two opposite ends of the curved section 222B11, and the waveguide arm 222B2 includes a curved section 222B21 and protruding portions 222B22 and 222B23 respectively coupled to two opposite ends of the curved section 222B21; in the phase delayed waveguide 224B, the waveguide arm 224B1 includes a curved section 224B11 and protruding portions 224B12 and 224B13 respectively coupled to two opposite ends of the curved section 224B11, and the waveguide arm 224B2 includes a curved section 224B21 and protruding portions 224B22 and 224B23 respectively coupled to two opposite ends of the curved section 224B21. The structural characteristics of the phase delayed waveguide 222B are identical to those of the phase delayed waveguide 322 shown in FIG. 4A, and thus the detailed description thereof is not repeated herein. The waveguide arm 224B2 is similar to the waveguide arm 222B1, except that the length of each of the protruding portions 224B22 and 224B23 is $L_1$. The waveguide arm 224B1 is similar to the waveguide arm 222B2, except that the length of each of the protruding portions 224B12 and 224B13 is $L_2$.

Figure 6:
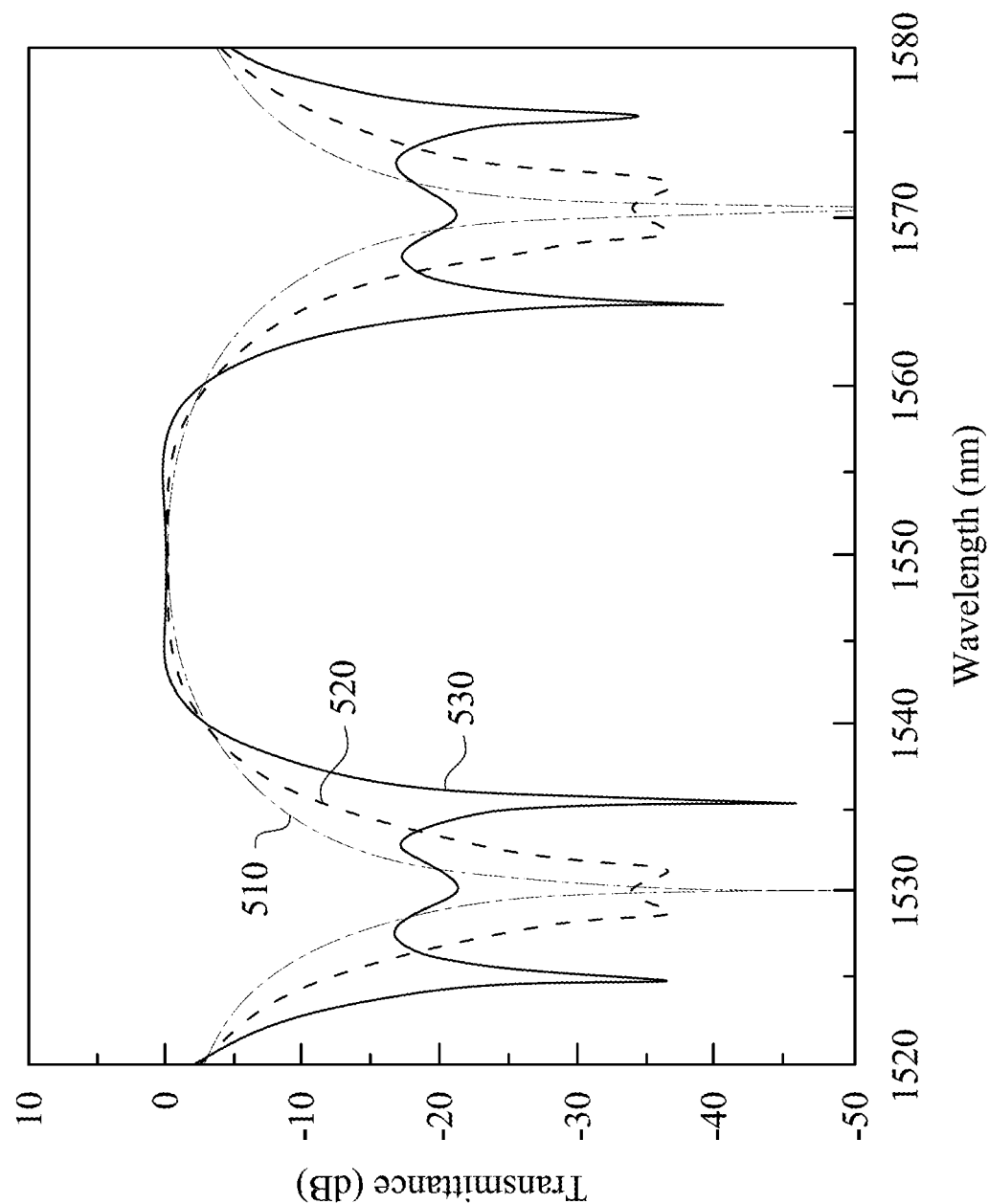
FIG. 6 shows the optical transmission spectra of the MZI structures shown in FIGS. 4A, 5A and 5B with their spectral responses designed for 1550 nm of wavelength.

FIG. 6 shows the optical transmittance spectra of the MZI structures 200A, 200B and 300 with their spectral responses designed for 1500 nm of wavelength, in which the curve 510 represents the optical transmittance performance of the MZI structure 300 shown in FIG. 4B, the curve 520 represents the optical transmittance performance of the MZI structure 200B shown in FIG. 2B, and the curve 530 represents the optical transmittance performance of the MZI structure 200A shown in FIG. 2A. For the light with the wavelength of 1550 nm, the 1-dB wavelength bandwidth, the 10-dB wavelength bandwidth and the radio of the 1-dB wavelength bandwidth to the 10-dB wavelength bandwidth of the curve 510 are respectively 11.880 nm, 32.102 nm and 37.0%, the 1-dB wavelength bandwidth, the 10-dB wavelength bandwidth and the radio of the 1-dB wavelength bandwidth to the 10-dB wavelength bandwidth of the curve 520 are respectively 14.661 nm, 28.437 nm and 51.6%, and the 1-dB wavelength bandwidth, the 10-dB wavelength bandwidth and the radio of the 1-dB wavelength bandwidth to the 10-dB wavelength bandwidth of the curve 530 are respectively 16.809 nm, 25.024 nm and 67.2%. As can be seen by comparing the curves 510, 520 and 530, the MZI structure with more stages has a higher ratio of the 1-dB wavelength bandwidth to the 10-dB wavelength bandwidth, and less likely to have optical crosstalk among different optical channels. However, the MZI structure with more stages also has a higher optical insertion loss and a larger device footprint. Considering the above factors, in the design of wavelength division multiplexers and demultiplexers, the number of stages of each MZI structure can be determined according to the application requirements.

Taking an optical beam with the wavelengths of 1510 nm, 1530 nm, 1550 nm, 1570 nm divided into four optical beams respectively with the wavelengths of 1510 nm, 1530 nm, 1550 nm and 1570 nm for example, in the wavelength division multiplexer and demultiplexer 100, the first-stage MZI structure S11 and the second-stage MZI structures S12A, S12B of the first waveguide structure 110 may be exemplarily the MZI structure 200A shown in FIG. 2A and FIG. 5A or another similar three-stage MZI structure, and the first-stage MZI structure S21 and the second-stage MZI structures S22A, S22B of each of the second waveguide structures 121, 122 may be exemplarily the MZI structure 200B shown in FIG. 2B and FIG. 5B or another similar two-stage MZI structure.

In the following paragraphs, the wavelength division multiplexer and demultiplexer is exemplified as an embodiment in which the MZI structure 200A is implemented as the first-stage MZI structure S11 and the second-stage MZI structures S12A, S12B of the first waveguide structure 110 and the MZI structure 200B is implemented as the first-stage MZI structure S21 and the second-stage MZI structures S22A, S22B of the each of the second waveguide structures 121 and 122. For the first-stage MZI structure S11 and the second-stage MZI structures S12A, S12B in the first waveguide structure 110, the cross-coupling coefficients $\kappa_1$-$\kappa_4$ may be 0.5, 0.17, 0.23 and 0.05, respectively. For the first-stage MZI structure S21 and the second-stage MZI structures S22A, S22B in each of the second waveguide structures 121, 122, the cross-coupling coefficients $\kappa_1$-$\kappa_3$ may be 0.5, 0.3 and 0.05, respectively.

In combination with the contents shown in FIGS. 1, 2A, 2B and 4B, in the wavelength division multiplexer and demultiplexer 100, the input terminals IN2 of the second-stage MZI structures S12A, S12B are respectively coupled to the output terminals OUT1, OUT2 of the first-stage MZI structure S11, the input terminal IN2 of the first-stage MZI structures S21 of the second waveguide structure 121 is coupled to the output terminal OUT1 of the second-stage MZI structure S12A, the input terminal IN1 of the first-stage MZI structures S21 of the second waveguide structure 122 is coupled to the output terminal OUT1 of the second-stage MZI structure S12B, and in each of the second waveguide structures 121, 122, the output terminals OUT1, OUT2 of the first-stage MZI structure S21 are respectively coupled to the input terminal IN2 of the second-stage MZI structure S22A and the input terminal IN1 of the second-stage MZI structure S22B. Each of the second-stage MZI structures S22A, S22B is configured in cross-state condition. That is, in the second waveguide structure 121, the output terminal OUT1 of the second-stage MZI structure S22A and the output terminal OUT2 of the second-stage MZI structure S22B are respectively configured as channels CH1, CH2 for outputting optical beams, and in the second waveguide structure 122, the output terminal OUT1 of the second-stage MZI structure S22A and the output terminal OUT2 of the second-stage MZI structure S22B are respectively configured as channels CH3, CH4 for outputting optical beams.

Figure 7A:
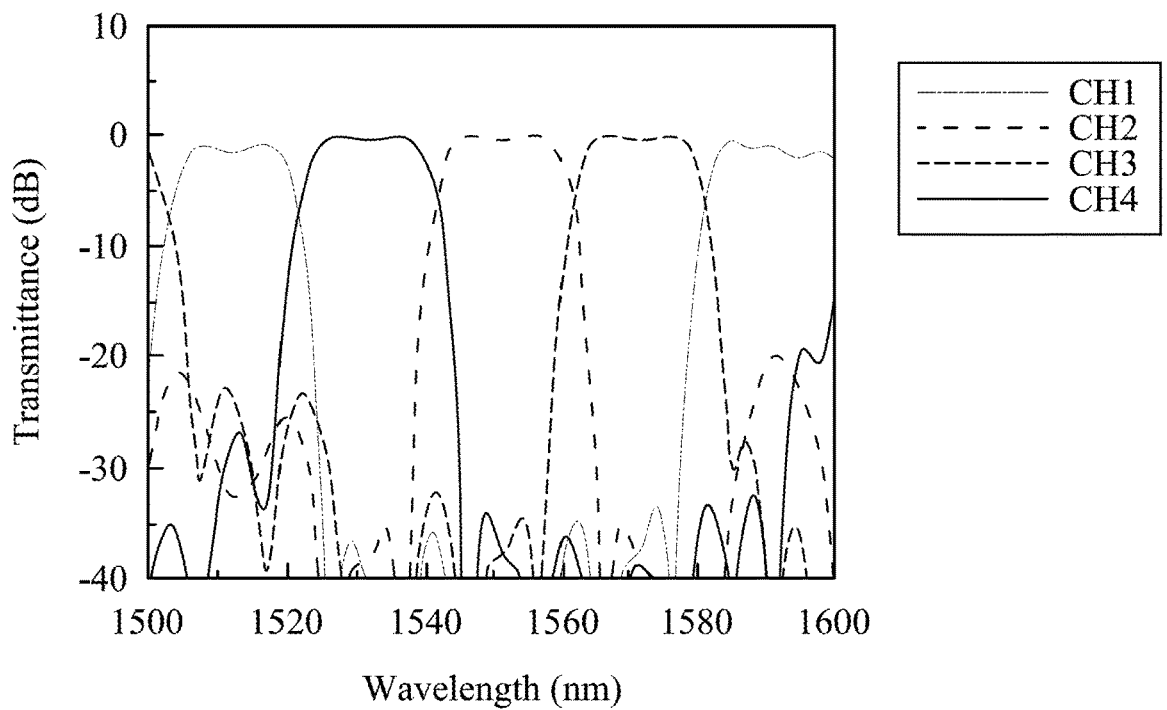
FIGS. 7A and 7B show respectively the optical transmittance spectra of a four-channel wavelength division multiplexer and demultiplexer according to a comparative example and a wavelength division multiplexer and demultiplexer according to an embodiment of the present disclosure.
Figure 7B:
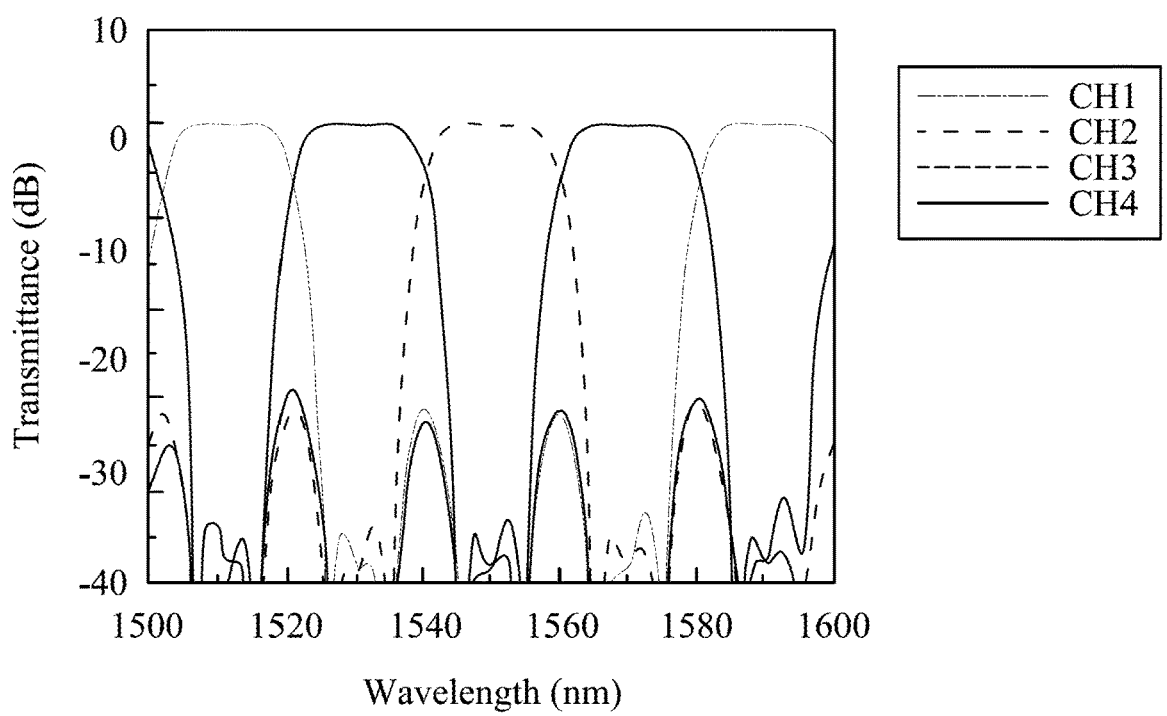
Figure 8:
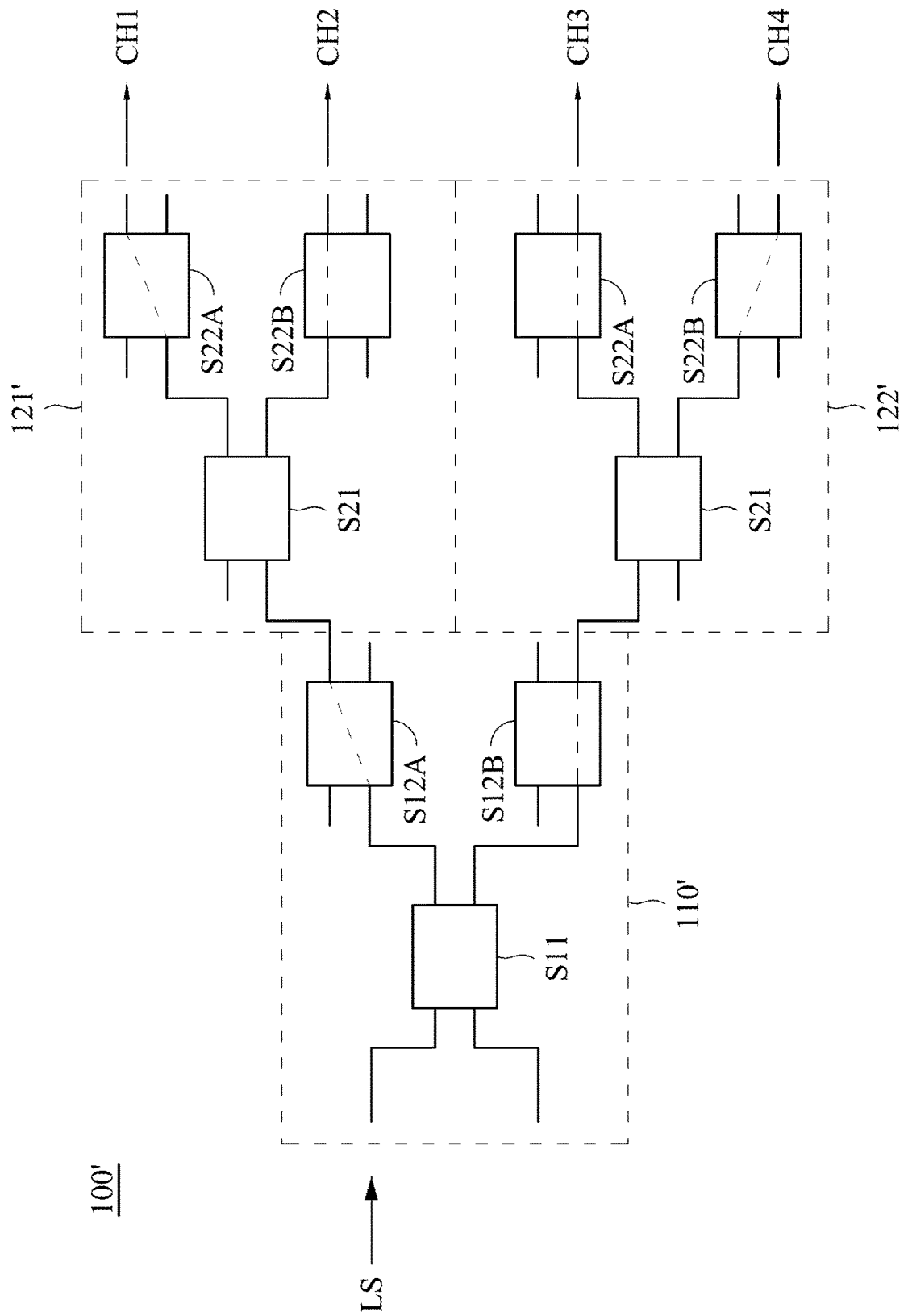
FIG. 8 is a schematic structural arrangement diagram of a wavelength division multiplexer and demultiplexer in accordance with a comparative example.

FIGS. 7A and 7B show respectively the optical transmittance spectra of a four-channel wavelength division multiplexer and demultiplexer 100' according to a comparative example and the wavelength division multiplexer and demultiplexer 100 according to an embodiment of the present disclosure. The components of the wavelength division multiplexer and demultiplexer 100' are approximately the same as those of the wavelength division multiplexer and demultiplexer 100. For the arrangement of the wavelength division multiplexer and demultiplexer 100' shown in FIG. 8, in which the second-stage MZI structure S12B of the first waveguide structure 110', the second-stage MZI structure S22B of the second waveguide structure 121' and the second-stage MZI structure S22A of the second waveguide structure 122' are configured in bar-state condition, and the second-stage MZI structure S12A of the first waveguide structure 110', the second-stage MZI structure S22A of the second waveguide structure 121' and the second-stage MZI structure S22B of the second waveguide structure 122' are configured in cross-state condition. Oppositely, for the arrangement of the wavelength division multiplexer and demultiplexer 100 shown in FIG. 1, the second-stage MZI structures S12A, S12B, S22A, S22B are all configured in cross-state condition. As can be seen by comparing the optical transmittance spectra in FIGS. 7A and 7B, the extinction ratio of the wavelength division multiplexer and demultiplexer 100' at the wavelength of 1510 nm (CH1) is about 20 dB, which suffers from significant optical crosstalk from the other optical channels and higher optical insertion loss, while the extinction ratio of the wavelength division multiplexer and demultiplexer 100 at each of the wavelengths of 1510 nm, 1530 nm, 1550 nm and 1570 nm is higher than 30 dB. Therefore, the wavelength division multiplexer and demultiplexer 100 can effectively reduce the optical crosstalk phenomenon as well as the optical insertion loss at each of the channels CH1-CH4.

Figure 9:
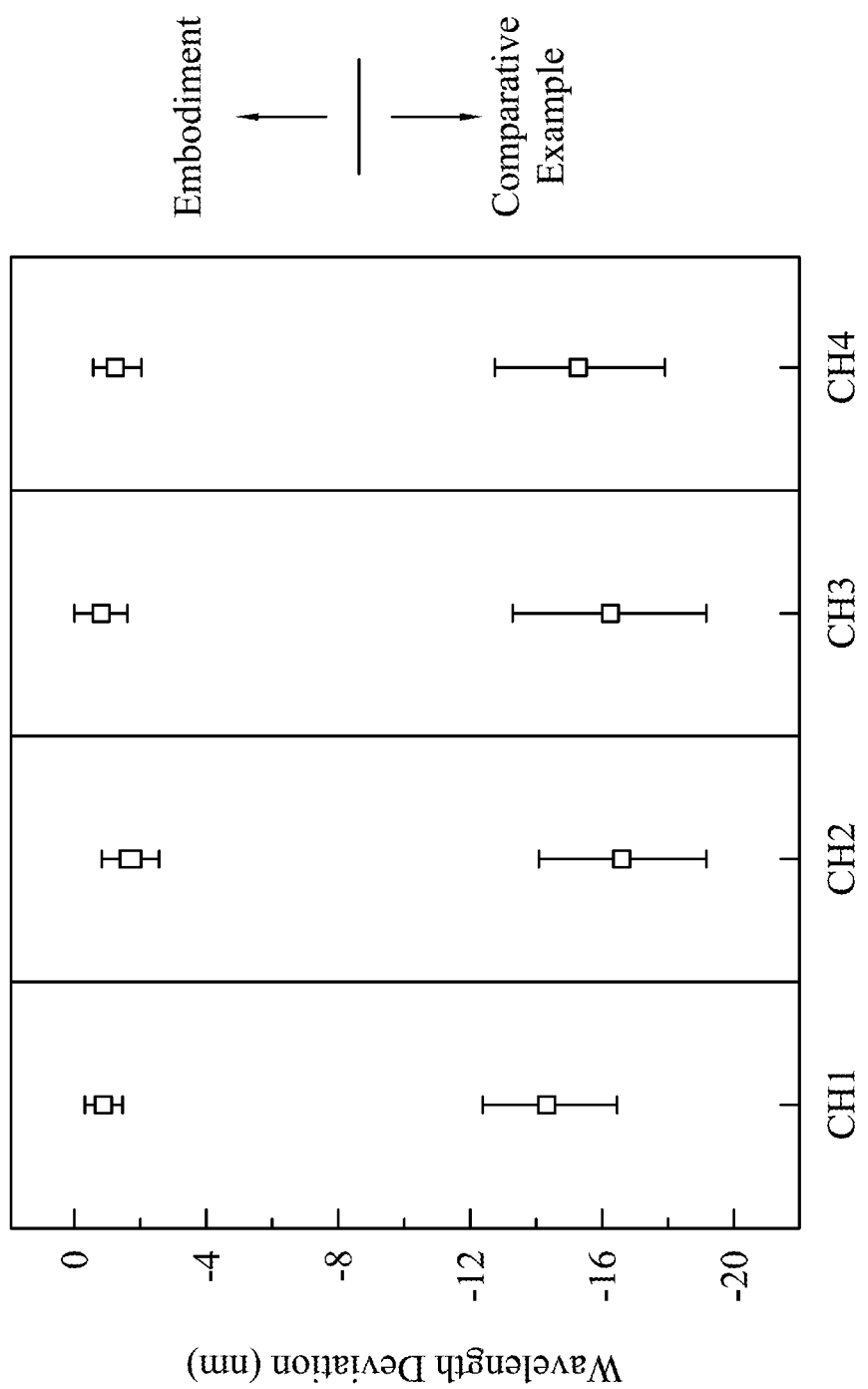
FIG. 9 is a plot depicting the wavelength errors of the output beams by the wavelength division multiplexers and demultiplexers according to an embodiment of the present disclosure and a comparative example.

Also, the phase delayed waveguide design with different lengths and widths in accordance with various embodiments of the present disclosure is capable of enhancing fabrication tolerance as well as reducing the wavelength error of the output optical beam. FIG. 9 is a plot depicting the wavelength errors of the output beams by the wavelength division multiplexers and demultiplexers according to an embodiment of the present disclosure and a comparative example, in which the comparative example is a wavelength division multiplexer and demultiplexer that applies the phase delayed waveguide design with the same width, while the embodiment of the present disclosure is a wavelength division multiplexer and demultiplexer that applies the phase delayed waveguide design with combination of different lengths and widths. For the wavelength division multiplexer and demultiplexer applying the phase delayed waveguide design with the same width according to the comparative example and fabricated by a semiconductor process, the wavelength error of the output optical beam in each of the channels CH1-CH4 is between 12 nm and 20 nm, and the mean error and the standard deviation of each output beam are 15 nm and 2.5 nm, respectively. In comparison with the comparative example, for the wavelength division multiplexer and demultiplexer applying the phase delayed waveguide design with combination of different lengths and widths according to the embodiment of the present disclosure and fabricated by the same semiconductor process, the wavelength error of the output optical beam in each of the channels CH1-CH4 is less than 3 nm, and the mean error and the standard deviation of each output beam are reduced to about 0.67 nm and 0.7 nm, respectively. Moreover, in a case where the width variation of the phase delayed waveguides is within 20 nm, the wavelength division multiplexer and demultiplexer that applies the phase delayed waveguide design with the same width according to the comparative example has a wavelength shift per unit width variation of 0.75 nm/nm, while the wavelength division multiplexer and demultiplexer that applies the phase delayed waveguide design with different lengths and widths according to the embodiment of the present disclosure has a wavelength shift per unit width variation of only 6 pm/nm. As can be seen from above, by applying the phase delayed waveguide design with combination of different lengths and widths in accordance with various embodiments of the present disclosure to fabrication of multiplexers and demultiplexers, the wavelength shift due to process variations can be effectively reduced, and thus the device production yield can be improved.

Figure 10:
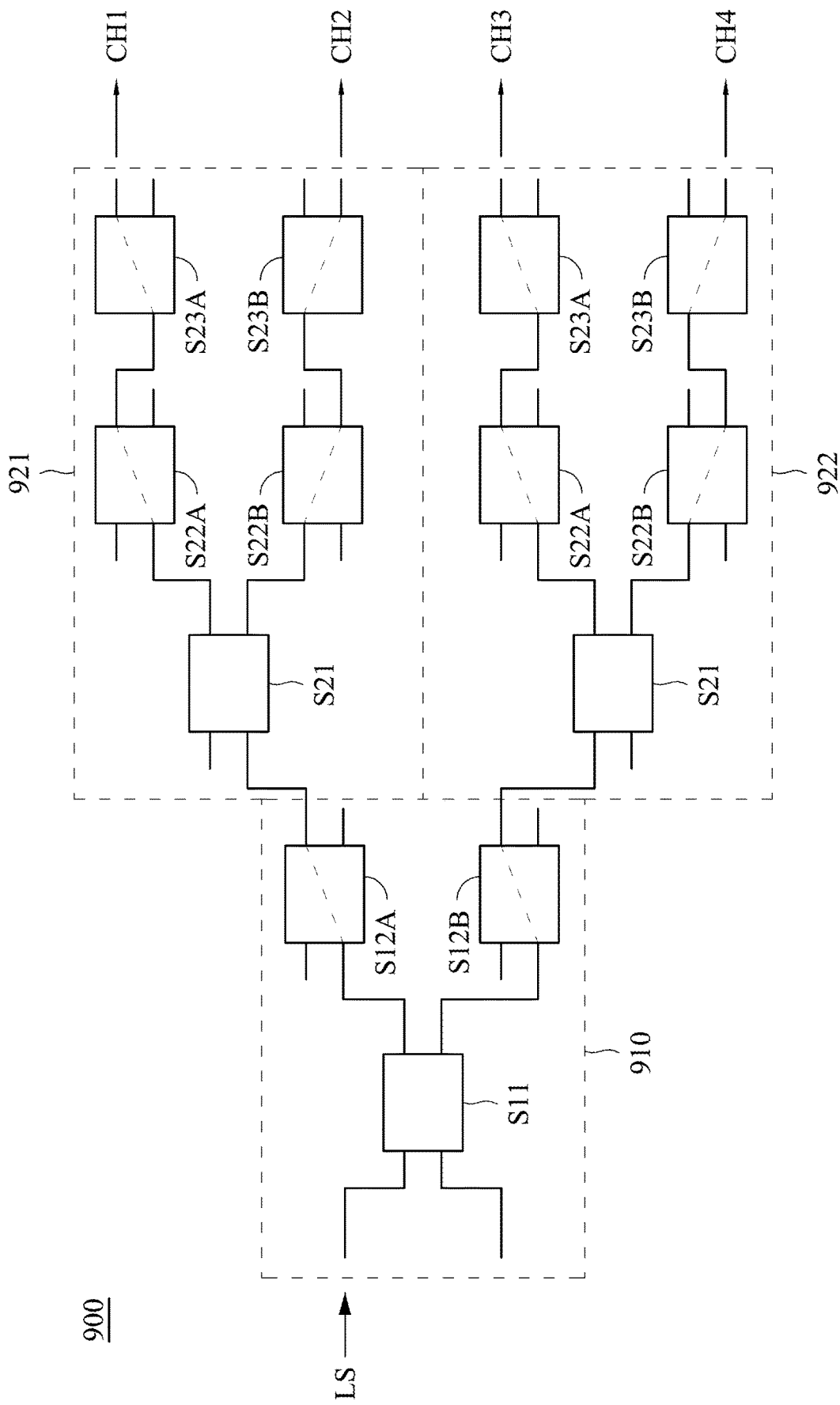
FIG. 10 is a schematic component arrangement diagram of a wavelength division multiplexer and demultiplexer in accordance with one or more embodiments of the present disclosure.

In addition, in the wavelength division multiplexer and demultiplexer 100 shown in FIG. 1, the number of interferometric device structures in the first waveguide structure 110 and/or the second waveguide structures 121, 122 may be modified depending on design requirements. FIG. 10 is a schematic component arrangement diagram of a wavelength division multiplexer and demultiplexer 900 in accordance with one or more embodiments of the present disclosure. The wavelength division multiplexer and demultiplexer 900 includes one first waveguide structure 910 and two second waveguide structures 921, 922. In comparison with the wavelength division multiplexer and demultiplexer 100 in FIG. 1, in the wavelength division multiplexer and demultiplexer 900, the first waveguide structure 910 includes one first-stage MZI structure S11 and two second-stage MZI structures 512A, 512B, and each of the second waveguide structures 921, 922 includes a first-stage MZI structure S21 and second-stage MZI structures S22A, S22B in addition to third-stage MZI structures S23A, S23B. In each of the second waveguide structures 921, 922, one input terminal of the third-stage MZI structure S23A and one input terminal of the third-stage MZI structure S23B may be configured to respectively receive the second-stage output optical beams from the second-stage MZI structures S22A, S22B, and one output terminal of the third-stage MZI structure S23A and one output terminal of the third-stage MZI structure S23B may be configured to respectively transmit two third-stage output optical beams with different center wavelengths. The third-stage MZI structures S23A, S23B of the second waveguide structures 921, 922 are also all configured in cross-state condition. In the wavelength division multiplexer and demultiplexer 900, the third-stage MZI structures S23A, S23B of each of the second waveguide structures 921, 922 may be exemplarily the MZI structure 200B shown in FIG. 2B and FIG. 4B or another similar two-stage MZI structure.

Figure 11A:
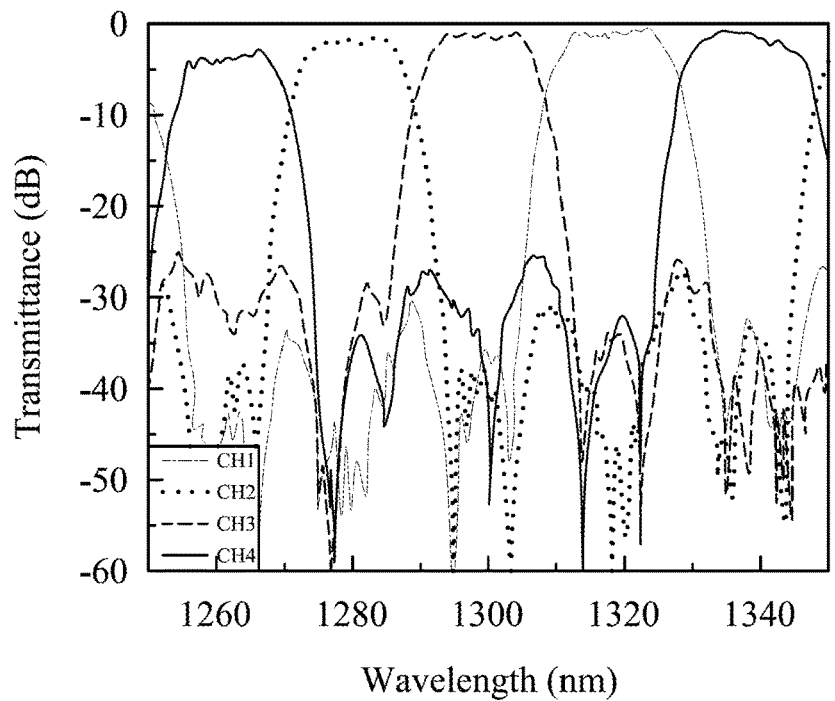
FIGS. 11A and 11B are measured optical transmittance spectra of the four-channel wavelength division multiplexers and demultiplexers in FIGS. 1 and 10, respectively.
Figure 11B:
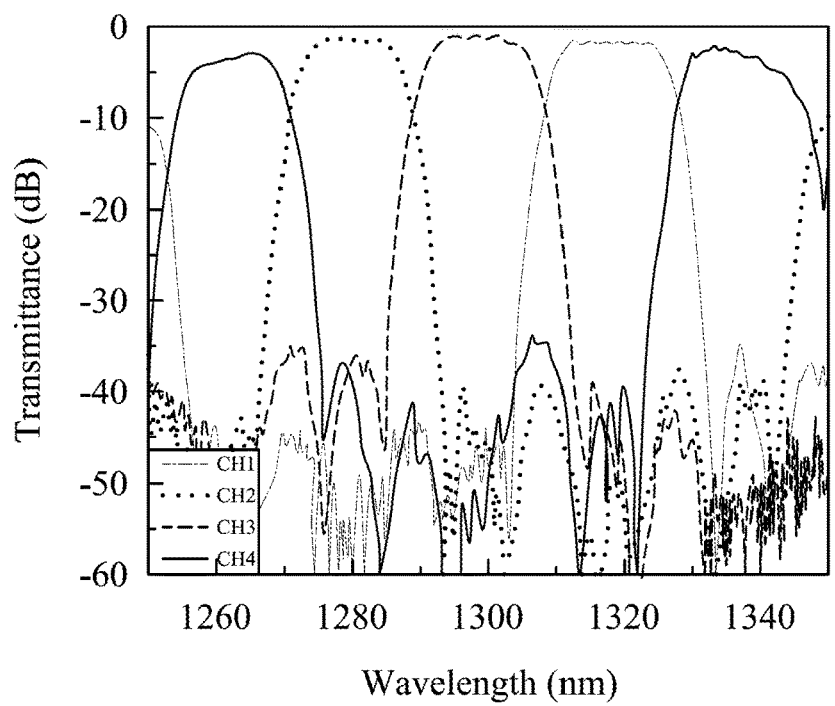

FIGS. 11A and 11B are measured optical transmittance spectra of the four-channel wavelength division multiplexer and demultiplexer 100 in FIG. 1 and the wavelength division multiplexer and demultiplexer 900 in FIG. 10, respectively, in which the optical beam LS includes wavelengths of 1260 nm, 1280 nm, 1300 nm, and 1320 nm in some implementations. As can be seen by comparing FIGS. 11A and 11B, by adding the third-stage MZI structures S23A, S23B, the extinction ratio of the wavelength division multiplexer and demultiplexer 900 at each of the wavelengths of 1260 nm, 1280 nm, 1300 nm and 1320 nm can be further increased to be approximately higher than 35 dB.

In the present disclosure, the structure of the wavelength division multiplexer and demultiplexer may be modified according to the embodiments described above to meet various requirements. For illustration, the wavelength division multiplexer and demultiplexer 100 in FIG. 1 may be modified to only include the first waveguide structure 110 for multiplexing and demultiplexing an optical beam with two different wavelengths. For example, if one input terminal of the first-stage MZI structure S11 is configured to receive an input optical beam LS with a first center wavelength and a third center wavelength, then an output terminal of the second-stage MZI structure 512A and an output terminal of the second-stage MZI structure 512B may be configured to respectively transmit a second-stage output optical beam with the first center wavelength and a second-stage output optical beam with the third center wavelength. The output terminals of the second-stage MZI structures S12A, S12B may also be respectively connected to MZI structures in cross-state condition in series to further increase the extinction ratio. In addition, in another embodiment, the channels CH1-CH4 of the second waveguide structures 121, 122 of the wavelength division multiplexer and demultiplexer 100 in FIG. 1 may be connected to another similar waveguide structure in series to realize multiplexing and demultiplexing for an optical beam with more wavelengths.

Summing up the above, the wavelength division multiplexer and demultiplexer of the present disclosure can achieve high fabrication tolerance to the waveguide width variation, thus can effectively reduce wavelength shift due to process variation. In addition, the wavelength division multiplexer and demultiplexer of the present disclosure also effectively reduce the optical crosstalk among all channels by applying cross-state condition to MZI structures at the optical outputs.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wavelength division multiplexer and demultiplexer, comprising:
   a waveguide structure, comprising:
      a first-stage Mach-Zehnder interferometer (MZI) structure having two input terminals and two output terminals, wherein one of the input terminals is configured to receive an input optical beam with a first center wavelength and a second center wavelength, and wherein the output terminals are configured to transmit one first-stage output optical beam with the first center wavelength and another first-stage output optical beam with the second center wavelength, respectively; and two second-stage MZI structures, wherein one input terminal of one of the second-stage MZI structures and one input terminal of the other second-stage MZI structure are configured to respectively receive the first-stage output optical beams, one output terminal of one of the second-stage MZI structures and one output terminal of the other second-stage MZI structure are configured to transmit one second-stage output optical beam with the first center wavelength and another second-stage output optical beam with the second center wavelength, respectively, and each second-stage MZI structure is configured in cross-state condition such that the one second-stage output optical beam and the one first-stage output optical beam are not in the same optical waveguide path, the another second-stage output optical beam and the another first-stage output optical beam are not in the same optical waveguide path, and no optical beam is outputted through an other output terminal of each second-stage MZI structure.

2. The wavelength division multiplexer and demultiplexer of claim 1, wherein the first-stage MZI structure comprises at least two optical couplers and at least one set of phase delayed waveguides that are alternately coupled, and wherein lengths and widths of two waveguide arms in the same set of phase delayed waveguides are different to each other.

3. The wavelength division multiplexer and demultiplexer of claim 1, wherein each second-stage MZI structure comprises at least two optical couplers and at least one set of phase delayed waveguides that are alternately coupled, and wherein lengths and widths of two waveguide arms in the same set of phase delayed waveguides are different to each other.

4. The wavelength division multiplexer and demultiplexer of claim 3, wherein the phase delayed waveguides of the second-stage MZI structures have relative optical path phase shifts of 0 and $\pi$, respectively.

5. The wavelength division multiplexer and demultiplexer of claim 1, wherein the waveguide structure further comprises:

two third-stage MZI structures, wherein one input terminal of one of the third-stage MZI structures and one input terminal of the other third-stage MZI structure are configured to respectively receive the second-stage output optical beams of the second-stage MZI structures, one output terminal of one of the third-stage MZI structures and one output terminal of the other third-stage MZI structure are configured to transmit one third-stage output optical beam with the first center wavelength and another third-stage output optical beam with the second center wavelength, respectively, and each third-stage MZI structure is configured in cross-state condition.

6. The wavelength division multiplexer and demultiplexer of claim 5, wherein each third-stage MZI structure comprises at least two optical couplers and at least one set of phase delayed waveguides that are alternately coupled, and wherein lengths and widths of two waveguide arms in the same phase delayed waveguide are different to each other.

7. A wavelength division multiplexer and demultiplexer, comprising:

a first waveguide structure, comprising:

a first-stage MZI structure having two input terminals and two output terminals, wherein one of the input terminals is configured to receive an input optical beam with a first center wavelength, a second center wavelength, a third center wavelength and a fourth center wavelength, and wherein the output terminals are configured to transmit one first-stage output optical beam with the first and second center wavelengths and another first-stage output optical beam with the third and fourth center wavelengths, respectively; and two second-stage MZI structures, wherein one input terminal of one of the second-stage MZI structures and one input terminal of the other second-stage MZI structure are configured to respectively receive the first-stage output optical beams, one output terminal of one of the second-stage MZI structures and one output terminal of the other second-stage MZI structure are configured to transmit t one second-stage output optical beam with the first center wavelength and the second center wavelength and another second-stage output optical beam with the third center wavelength and the fourth center wavelength, respectively, and each second-stage MZI structure is configured in cross-state condition such that the one second-stage output optical beam and the one first-stage output optical beam are not in the same optical waveguide path, the another second-stage output optical beam and the another first-stage output optical beam are not in the same optical waveguide path, and no optical beam is outputted through an other output terminal of each second-stage MZI structure; and two second waveguide structures, one of the second waveguide structures comprising:

a first-stage MZI structure having two input terminals and two output terminals, wherein one of the input terminals is configured to receive the second-stage output optical beam with the first and second center wavelengths outputted by the first waveguide structure, and the output terminals are configured to transmit one first-stage output optical beam with the first center wavelength and another first-stage output optical beam with the second center wavelength, respectively; and two second-stage MZI structures each configured in cross-state condition and each having two input terminals and two output terminals, wherein one input terminal of one of the second-stage MZI structures and one input terminal of the other second-stage MZI structure are configured to respectively receive the first-stage output optical beam with the first center wavelength and the first-stage output optical beam with the second center wavelength, and one output terminal of one of the second-stage MZI structures and one output terminal of the other second-stage MZI structure are configured to transmit one second-stage output optical beam with the first center wavelength and another second-stage output optical beam with the second center wavelength, respectively;

the other one of the second waveguide structure comprising:

a first-stage MZI structure having two input terminals and two output terminals, wherein one of the input terminals is configured to receive the second-stage output optical beam with the third and fourth center wavelengths outputted by the first waveguide structure, and the output terminals are configured to transmit one first-stage output optical beam with the third center wavelength and another first-stage output optical beam with the fourth center wavelength, respectively; and two second-stage MZI structures each configured in cross-state condition and each having two input terminals and two output terminals, wherein one input terminal of one of the second-stage MZI structures and one input terminal of the other second-stage MZI structure are with the third center wavelength and the first-stage output optical beam with the fourth center wavelength, and one output terminal of one of the second-stage MZI structures and one output terminal of the other second-stage MZI structure are configured to transmit one second-stage output optical beam with the third center wavelength and another second-stage output optical beam with the fourth center wavelength, respectively.

8. The wavelength division multiplexer and demultiplexer of claim 7, wherein phase delayed waveguides of the second-stage MZI structures of the first waveguide structure respectively have relative optical path phase shifts of 0 and $\pi$, phase delayed waveguides of the first-stage MZI structures of the second waveguide structures respectively have relative optical path phase shifts of 0 and $\pi/2$, and phase delayed waveguides of the second-stage MZI structures of the second waveguide structures respectively have relative optical path phase shifts of 0, $\pi$, $3\pi/2$ and $\pi/2$.

9. The wavelength division multiplexer and demultiplexer of claim 7, wherein each of the first-stage MZI structure and the second-stage MZI structures of the first waveguide structure comprises four optical couplers and three sets of phase delayed waveguides that are alternately coupled, and wherein lengths and widths of two waveguide arms in the same phase delayed waveguide are different to each other.

10. The wavelength division multiplexer and demultiplexer of claim 9, wherein cross-coupling coefficients of the four optical couplers in each of the first-stage MZI structure and the second-stage MZI structures of the first waveguide structure are 0.5, 0.17, 0.23 and 0.05, respectively.

11. The wavelength division multiplexer and demultiplexer of claim 7, wherein each of the first-stage MZI structure and the second-stage MZI structures of each of the second waveguide structures comprises three optical couplers and two sets of phase delayed waveguides that are alternately coupled, and wherein lengths and widths of two waveguide arms in the same phase delayed waveguide are different to each other.

12. The wavelength division multiplexer and demultiplexer of claim 11, wherein cross-coupling coefficients of the three optical couplers in each of the first-stage MZI structure and the second-stage MZI structures of each of the second waveguide structures are 0.5, 0.3 and 0.05, respectively.

13. The wavelength division multiplexer and demultiplexer of claim 7, wherein one of the second waveguide structures further comprises:

two third-stage MZI structures, wherein one input terminal of one of the third-stage MZI structures and one input terminal of the other third-stage MZI structure are configured to respectively receive the second-stage output optical beams respectively with the first and second center wavelengths from the second-stage MZI structures, one output terminal of one of the third-stage MZI structures and one output terminal of the other third-stage MZI structure are configured to transmit one third-stage output optical beam with the first center wavelength and another third-stage output optical beam with the second center wavelength, respectively, and each third-stage MZI structure is configured in cross-state condition; and the other of the second waveguide structures further comprises:

two third-stage MZI structures, wherein one input terminal of one of the third-stage MZI structures and one input terminal of the other third-stage MZI structure are configured to respectively receive the second-stage output optical beams respectively with the third and fourth center wavelengths from the second-stage MZI structures, one output terminal of one of the third-stage MZI structures and one output terminal of the other third-stage MZI structure are configured to transmit one third-stage output optical beam with the third center wavelength and another third-stage output optical beam with the fourth center wavelength, respectively, and each third-stage MZI structure is configured in cross-state condition.

14. The wavelength division multiplexer and demultiplexer of claim 13, wherein each third-stage MZI structure of each second waveguide structure comprises three optical couplers and two sets of phase delayed waveguides that are alternately coupled, and wherein lengths and widths of two waveguide arms in the same phase delayed waveguide are different to each other.

15. The wavelength division multiplexer and demultiplexer of claim 14, wherein cross-coupling coefficients of the three optical couplers in each third-stage MZI structure are 0.5, 0.3 and 0.05, respectively.

* * * * *